United States Patent [19]

Cobey

[11] Patent Number: 4,478,520
[45] Date of Patent: Oct. 23, 1984

[54] COMPOST TURNING AND SHREDDING APPARATUS

[76] Inventor: Herbert T. Cobey, P.O. Box 154, Galion, Ohio 44835

[21] Appl. No.: 432,292

[22] Filed: Oct. 1, 1982

[51] Int. Cl.³ ............................................. B01F 15/02
[52] U.S. Cl. ...................................... 366/345; 37/250; 366/327
[58] Field of Search ................... 366/345, 346; 37/249, 37/250, 251, 255; 198/513, 669, 518; 56/14.4, 364; 171/68, 65

[56] References Cited

U.S. PATENT DOCUMENTS

| | | | | |
|---|---|---|---|---|
| 3,369,797 | 2/1968 | Cobey | ................................. | 366/327 |
| 3,776,528 | 12/1973 | Toto | ..................................... | 366/345 |
| 3,856,276 | 12/1974 | Pannell | ................................ | 366/345 |

FOREIGN PATENT DOCUMENTS 2053963 6/1971 Fed. Rep. of Germany ........ 37/255

Primary Examiner—Robert W. Jenkins
Attorney, Agent, or Firm—Leydig, Voit, Osann, Mayer & Holt, Ltd.

[57] ABSTRACT

A compost turning machine which travels along the ground and straddles a compost windrow, and which carries a rotating drum for turning the composting material. An adjustable auger system is located outboard and ahead of the rotating drum to collect composting material and deposit it in the path of the rotating drum. Each auger is independently driven by a hydraulic motor and can be individually raised or lowered as required.

4 Claims, 2 Drawing Figures

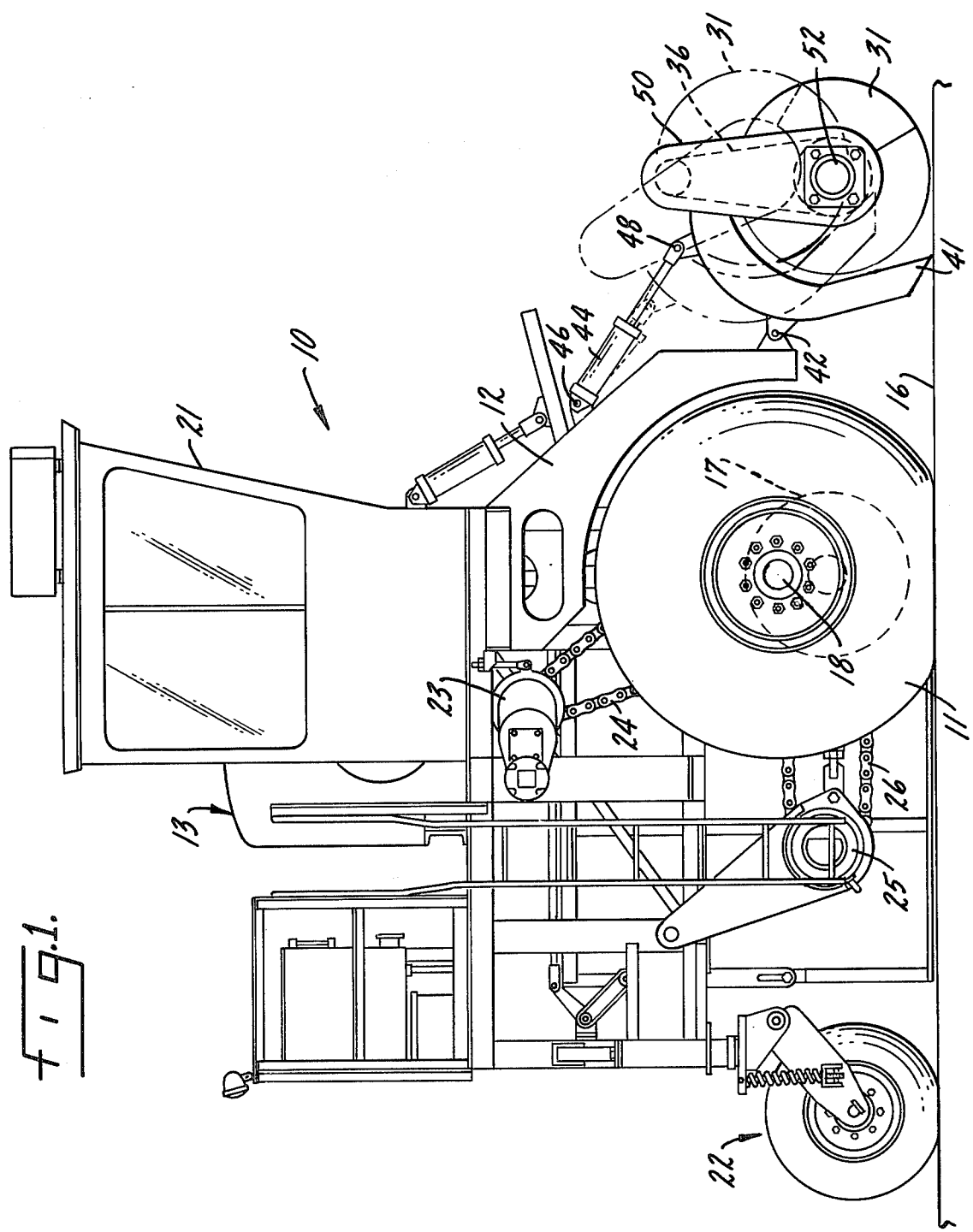

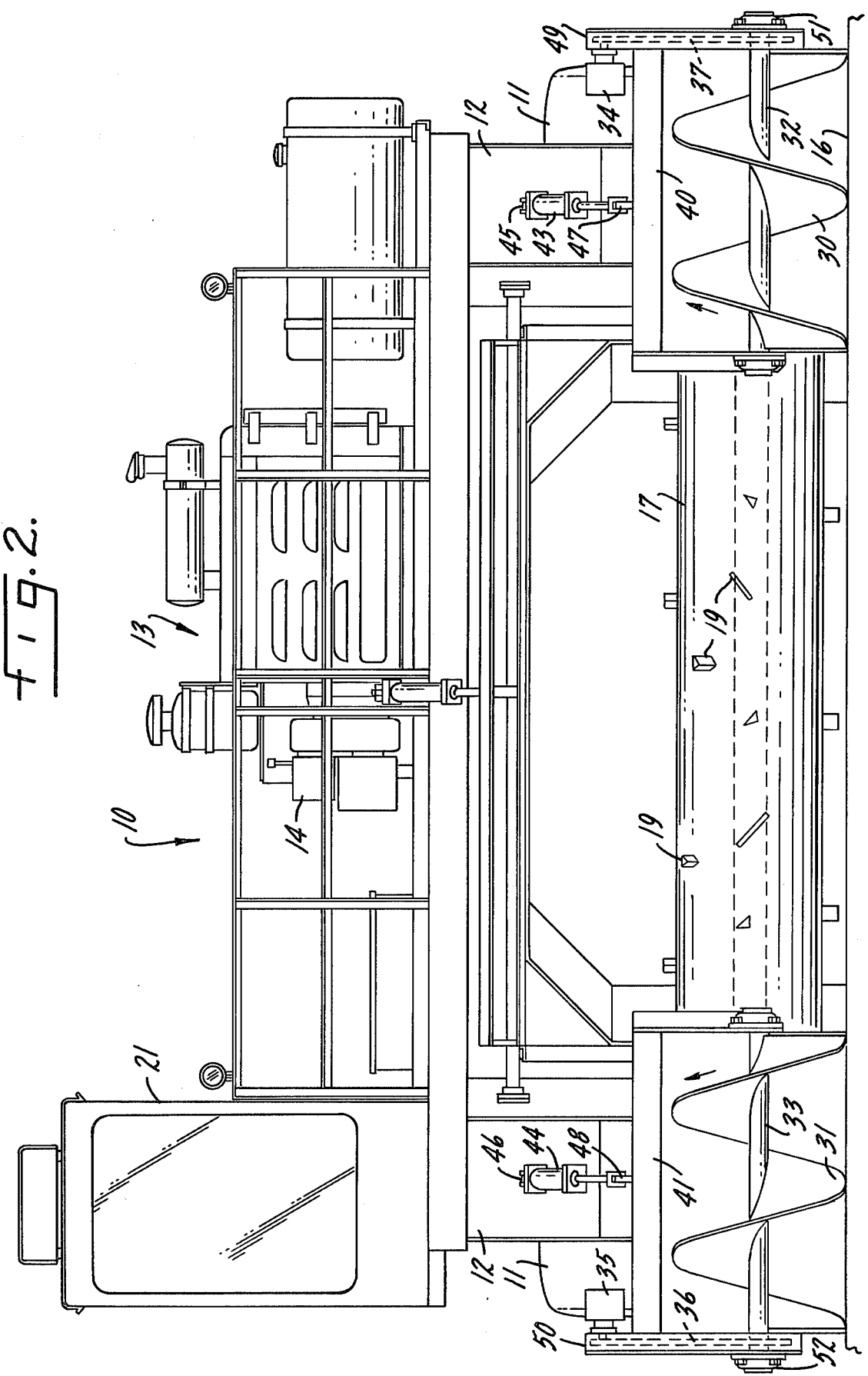

COMPOST TURNING AND SHREDDING APPARATUS

FIELD OF THE INVENTION

The present invention relates generally to an auger system which is mounted on a compost turner and windrow forming machine.

BACKGROUND OF THE INVENTION

Society is burdened with an ever increasing amount of both organic and inorganic waste to dispose of in an economical yet safe means. The organic waste material, commonly referred to as refuse, may include a variety of materials such as leaves, saw dust, straw, livestock manure, garbage, and other waste materials which will decay and form compost under moist, aerobic conditions. Such compost material is often collected into windrows which are approximately 8 to 10 feet wide, 3 to 6 feet high, and several hundred feet long (windrows can be as long as desired) for the purpose of decomposing. During the composting process it becomes necessary from time to time to turn the contents of the windrow to allow fresher air to permeate into the composting material. A compost turner, such as the one shown in U.S. Pat. No. 3,369,797, is used to straddle a windrow and turn over the composting material. Machines of this type are well suited for turning a windrow, however, when material is dumped it may spill sideways and after the windrow has been turned several times, the composting material has a tendency to spread out so that the rotating drum of the compost turner does not extend as far as the windrow is wide. In addition, the outboard drive wheels of the compost turner, which are outboard of the rotating drum which turns the composting material, have a tendency to slip and lose traction on the composting material laying outside of the path of the rotating drum.

OBJECTS OF THE INVENTION

The principle object of the present invention is to provide a means to arrange and maintain composting material in uniform windrows of a predetermined width.

It is also an object to increase the traction of a compost turning machine by cleaning the composting pad area directly ahead of the outboard wheels.

It is a further object to increase the quality of the composting material by ensuring that all of the scattered material is collected into the main body of the windrow.

It is a still further object to increase the turning rate of a compost turning machine by maintaining the windrows in a uniform condition both before and after a turning operation.

Finally, it is an object to provide an apparatus which is easily adapted to existing compost turning machines.

Other objects and advantages of the invention will become apparent upon reading the attached detailed description and upon reference to the drawings, in which:

BRIEF DESCRIPTION OF THE DRAWINGS

FIG. 1 is a side elevation view of a typical compost turning machine with a pair of augers mounted outside of the rotating drum; and, FIG. 2 is a front elevation of the machine shown in FIG. 1.

While the invention has been described in connection with certain preferred embodiments, it will be understood that I do not intend to be limited to the embodiments shown but intend, on the contrary, to cover the various alternative forms of the invention as may be included within the spirit and scope of the invention as defined in the appended claims.

DETAILED DESCRIPTION OF THE INVENTION

Turning to FIG. 1 there is shown a typical compost turning machine 10 which is capable of straddling a compost windrow (not shown). The machine 10 includes inter alia a pair of drive wheels 11, a frame 12, a power plant 13, and a hydraulic pump and reservoir system 14. The power plant 13 may be an internal combustion engine which provides the power for driving the machine 10 as well as for charging the hydraulic pump 14 and the related hydraulic reservoir system.

The compost turning machine 10 can be controlled by one person located in cab 21, the machine being maneuvered by the drive wheels 11 while the wheel assembly 22 located at the rear of the machine acts as a follower. The hydraulic pump 14 provides hydraulic fluid under pressure to drive hydraulic motor 23, which in turn rotates the drive wheels 11 via drive chain 24. Also, the hydraulic pump 14 provides fluid pressure to hydraulic motor 25 which in turn rotates drum 17 via drive chain 26.

The composting material, which is collected in windrows on compost pad 16, must be periodically turned to accelerate oxidation influences and the bacterial decomposition process. To accomplish this, a rotating drum 17 is mounted in between drive wheels 11 and just below the axis 18 of the drive wheels. The periphery of the rotating drum 17 is provided with a plurality of throwing elements 19 which are actually teeth-like projections that facilitate lifting composting material into the air as drum 17 rotates and engages material.

As shown in FIG. 2, and in keeping with the present invention, a pair of augers 30, 31 are provided. The augers 30, 31 are mounted for rotational movement on shafts 32, 33. The shafts 32, 33 are parallel to shaft 20 of the rotating drum 17, however, shafts 32, 33 are mounted well ahead of and slightly above shaft 20 so that augers 30, 31 encounter composting material before the rotating drum 17 does. When viewing the augers 30 and 31 in FIG. 2, both rotate in a counterclockwise direction. By being mounted on opposite sides of drum 17, the augers collect substantially all of the composting material in their paths and feed it into the path of rotating drum 17.

The augers 30, 31 are driven by hydraulic motors 34, 35, shown schematically in FIG. 2. The motors 34, 35 can be of any commercially available type of sufficient power to drive each auger. Drive chains 36, 37 shown in phantom lines in FIGS. 1 and 2, provide the mechanical driving linkage between the motors 34, 35 and the augers 30, 31.

In another aspect of the invention, provision is made for cowlings 40, 41 which serve several functions. The cowlings 40, 41 are mounted on frame 12 at pivot 42 and along with augers 30, 31, swing through an arcuate path when double action hydraulic cylinders 43, 44 are actuated. The hydraulic cylinders 43, 44 are mounted to frame 12 at pivots 45, 46 and to cowlings 40, 41 at pivots 47, 48. When in the lowered position, cowlings 40, 41 act mainly as a protective shield to intercept any objects projected by the action of the augers 30, 31. It is also a function of the cowlings 40, 41 to scrape any composting material left on compost pad 16 by the augers 30, 31 so that the outboard drive wheels 11, which are behind the augers, contact as little composting material as possible. When in the raised position, the cowlings 40, 41 and augers 30, 31 provide at least as much ground clearance as other structures on the compost material 10.

A pair of chain guards 49, 50 are provided which extend from the hydraulic motors 34, 35 to just beyond the hubs 51, 52 of shafts 32, 33. The chain guards 49, 50 act as a shield where the drive chains 36, 37 engage the sprockets (not shown) of the hydraulic motors and at shafts 32, 33, the guards 49, 50 being sealed to provide an oil bath lubrication for the chains.

During actual operation the compost turning machine 10 straddles a compost windrow (not shown) to turn and mix the decomposing material. The composting material, although neatly piled in uniform windrows, invariably has the tendency to spread out so that the rows are actually wider than rotating drum 17. Augers 30 and 31 are positioned outboard and ahead of rotating drum 17 to collect composting material and deposit it into the path of drum 17. The augers not only assure that substantially all of the composting material is deposited in front of the rotating drum, they also clear the area directly in front of the drive wheels 11 of any composting material with the result of increased drive wheel to compost pad traction.

What is claimed is:

1. An apparatus for feeding compost into a compost-turning machine, the machine having a straddle frame which supports a rotatable compost-throwing member, a power means for rotating the compost-throwing member, the improvement comprising, in combination;
   (a) a pair of augers mounted outboard and ahead of the compost-throwing member, the augers being rotatably mounted to collect compost outboard of the compost-throwing member and depositing it into the path of the compost-throwing member;
   (b) means for rotating the augers;
   (c) means for raising and lowering the augers relative to the compost windrow; and
   (d) cowling means around each auger to act as a shield against any compost material which may be thrown into the air by the rotating action of the augers.

2. The apparatus as defined in claim 1, wherein the means for rotating the augers comprises a hydraulic motor and chain-drive system mounted near each auger for imparting individual rotational control.

3. The apparatus as defined in claim 1, wherein the means for raising and lowering the augers includes a single action hydraulic cylinder pivotably mounted at its one end on the machine frame and pivotably mounted at its other end on the auger cowling.

4. An apparatus for feeding compost into a compost-turning machine, the machine having a straddle frame which supports a rotatable compost-throwing member, a power means for rotating the compost-throwing member, the improvement comprising, in combination;
   (a) a pair of augers mounted outboard and ahead of the compost-throwing member, the augers being rotatably mounted to collect compost outboard of the compost-throwing member and depositing it into the path of the compost-throwing member;
   (b) means for rotating the augers;
   (c) cowling means around each auger to act as a shield against any compost material which may be thrown into the air by the rotating action of the augers, and is pivoted by an hydraulic cylinder said cowling is pivotally mounted on the straddle frame so that when the hydraulic cylinder is extended the cowling and auger travel in an arcuate path from a raised position to a lowered position where it will contact the composting material outboard of the compost-throwing member; and
   (d) means for raising and lowering the augers including a single action hydraulic cylinder pivotally mounted at its one end on the machine frame and pivotally mounted at its other end on the auger cowling.

* * * * *